United States Patent [19]

Stevens

[11] Patent Number: 4,771,647
[45] Date of Patent: Sep. 20, 1988

[54] COUNTERSHAFT TRANSMISSION

[75] Inventor: W. Gene Stevens, Dunlap, Ill.

[73] Assignee: Caterpillar Inc., Peoria, Ill.

[21] Appl. No.: 110,915

[22] Filed: Oct. 21, 1987

[51] Int. Cl.$^4$ .............................................. F16H 3/08
[52] U.S. Cl. ...................................... 74/331; 74/333; 74/359; 74/360
[58] Field of Search ................. 74/331, 333, 329, 357, 74/358, 359, 360, 361

[56] References Cited

U.S. PATENT DOCUMENTS

| | | | |
|---|---|---|---|
| 3,465,609 | 1/1967 | Fisher et al. | 74/360 |
| 3,916,710 | 11/1975 | Sisson et al. | 74/331 |
| 4,063,464 | 12/1977 | Crabb | 74/331 |
| 4,333,358 | 6/1982 | Grattapaglia | 74/359 |
| 4,341,127 | 7/1982 | Stodt | 74/333 |
| 4,392,391 | 7/1983 | Jameson et al. | 74/333 |
| 4,584,891 | 4/1986 | Mori | 74/331 |
| 4,589,295 | 5/1986 | Jerry et al. | 74/331 X |
| 4,726,246 | 2/1988 | Whalen | 74/360 |

FOREIGN PATENT DOCUMENTS

85/05665 12/1985 PCT Int'l Appl. .

Primary Examiner—Lawrence Staab
Assistant Examiner—Dwight G. Diehl
Attorney, Agent, or Firm—Charles E. Lanchantin, Jr.

[57] ABSTRACT

A countershaft transmission includes first and second directional clutches and first, second and third speed clutches of the hydraulically actuated, rotating disc type to provide three forward speeds and three reverse speeds for a track-type tractor or the like. Included is an input shaft with first and second gears connected to rotate therewith that define midplanes normal to the input shaft. The directional clutches and the speed clutches are located axially between the midplanes in radially aligned relationships and a plurality of other constantly meshing gears are used including at least one pair of gears located axially exteriorly of the midplanes for compactness and to promote speed reduction ratio flexibility. A second embodiment provides six forward speeds by adding a directional clutch and another gear within the same compact dimensions.

16 Claims, 3 Drawing Sheets

Fig_2_

4,771,647

COUNTERSHAFT TRANSMISSION

DESCRIPTION

TECHNICAL FIELD

This invention relates to a countershaft transmission for a heavy duty work vehicle, and more particularly to a countershaft transmission for a track-type tractor or the like and including a plurality of forward and reverse speeds utilizing constant mesh gearing and a plurality of fluid actuated, rotating disc type clutches so constructed and arranged as to provide maximum compactness and speed reduction ratio flexibility.

BACKGROUND ART

Countershaft transmissions having a plurality of speed ratios in each direction of operation are particularly useful in the drive line of heavy duty work vehicles such as wheel loaders, log skidders, lift trucks, and earthmoving machines. These transmissions are advantageous in that a plurality of rotating disc type clutches and associated continually meshing gears can be so positioned on the usual parallel shafts as to allow considerable design flexibility and an adaptability to the elevational drop requirement between the input and output axes.

One of the problems with such countershaft transmissions is that they have required too many shafts or gears. For example, many of them have an extra idler gear in order to provide the reversing function. This requires an additional bearing system along another axis parallel to that of the primary shafts at increased expense.

Another problem with these prior countershaft transmissions is that they have been axially too long. For example, two or even more rotating clutch assemblies and a plurality of gears have been arranged along a single shaft axis in such a way with respect to the supporting walls of the housing as to be of excessive length. Simultaneously, the shafts, clutches and gears must be closely radially spaced and internested so as to provide both a radially compact and axially compact module.

One countershaft transmission of the type generally described that has many advantages is disclosed in International Application No. PCT/US84/01352 filed Aug. 24, 1984 and published under the Patent Cooperation Treaty (PCT) on Dec. 19, 1985 as Publication No. W085/05665, and which is assigned to the Assignee of the present invention. Among other things it features a minimum elevational clearance above the upper input axis. Specifically, the input shaft is normally connected to the output member of the engine and/or the optional torque converter assembly of the vehicle, and the construction is such as to avoid locating large diameter components such as a rotating clutch thereat. Thus, the floor plates or portions of the operator station above the input shaft need not be unnecessarily elevated.

Furthermore, the individual speed reduction ratios of the desired transmission should not only provide the range of output speeds that will best serve the vehicle requirements, but should be capable of convenient modification. Specifically, it is preferred that for one track-type tractor application, each of the output shaft speeds corresponding to a reverse travel direction of the vehicle should be over 15% faster than the corresponding forward speed in the same gear. It should be an easy matter to change this relative speed, between first forward and first reverse, for example, without requiring modification of the individual speeds steps, without changing the central axes of the shafts, and without requiring much more than the substitution of certain gear pairs within the countershaft transmission. The countershaft transmission illustrated in PCT Publication No. W085/05665, and mentioned above, does not have a construction that will conveniently meet these requirements.

In certain applications, it is also desirable that the number of forward speeds of the countershaft transmission be easily increased to enlarge the capability thereof. For instance, a three forward speed unit used in conjunction with a hydrodynamic torque converter could be used in a track-type tractor for bulldozing and earthmoving tasks involving relative wide fluctuations of the output torque levels. On the other hand, a six forward speed unit serially connected to an engine without such a torque converter would be valuable in an agricultural tractor wherein the draw bar loads are more nearly constant and the greater efficiency of a direct mechanical drive would result in lower operating costs.

Still other desirable features are to maximize parts commonality by using similarly sized rotating clutch elements, to provide a long service life by so constructing and arranging the gears that undesirably high operating speeds or clutch plate engagement speeds are avoided, and to place the individual members thereof in locations that will allow their convenient assembly or disassembly with respect to the housing or case elements.

Accordingly, what is needed is a structurally simple, and both radially and axially compact constant mesh countershaft transmission providing a plurality of forward speeds using a minimal number of shafts, rotating clutches and associated elements. Preferably, the transmission should provide three or more forward speeds, should have a long service life using disc type rotating clutches and appropriately interconnected constantly meshing gears, and should be so constructed and arranged as to allow the effective conversion of the speed ratio collectively between the forward and reverse speeds independently of the individual speed reduction ratio steps or vice versa. Furthermore, it should be easy to increase the number of forward speed ratios with but minor modification, such as by the addition of one more clutch and a gear. This can provide a family of transmissions that can maximize parts commonality while making the family adaptable to a wide variety of vehicular applications.

DISCLOSURE OF THE INVENTION

The present invention is directed to overcoming one or more of the above problems.

In one aspect of the invention there is provided a countershaft transmission including an input shaft having first and second gears connected to rotate therewith, first and second countershafts, an output shaft, a third gear connected to rotate with the first countershaft, a fourth gear freely rotatably mounted on the first countershaft and intermeshed with the first gear, a first directional clutch for conjointly connecting the fourth gear to the first countershaft, a fifth gear connected to rotate with the second countershaft and intermeshed with the third gear, a sixth gear freely rotatably mounted on the second countershaft and intermeshed with the second gear, and a second directional clutch for conjointly connecting the sixth gear to the second countershaft. The first and second gears define midplanes normal to the input and shaft, and speed means are provided including a plurality of speed clutches for achieving a plurality of speeds of the output shaft when a directional clutch is engaged. Significantly, the directional clutches and the speed clutches are located between the midplanes in generally aligned relationships, and the third and fifth gears are located axially exteriorly of the midplanes for maximum compactness and are independent of the speed means for speed reduction ratio flexibility.

More specifically, one embodiment of the instant transmission provides three forward speeds and three reverse speeds using five disc type clutches and twelve gears, although it is to be appreciated that all three reverse speeds need not be utilized in certain vehicular applications. All of the directional gear trains are arranged in gear pairs which are independent of any relationship to the speed gear trains which are also desirably arranged in gear pairs. Thus, the speed reduction ratio difference between first forward and first reverse speeds can be over 15% so as to provide a faster reverse travel speed and a greater torque output in the forward working range. Moreover, by adding one more disc type clutch and a thirteenth gear in another embodiment the number of forward speeds can be doubled to six while not adding any volumetric change exteriorly of the housing. In a developed side elevational view the third and fifth gears are located at the rear end of the transmission and the ninth and twelfth gears are located at the front exteriorly of the midplanes of the first and second gears with the clutches being disposed between those midplanes in a extremely compact manner.

BEST MODE FOR CARRYING OUT THE INVENTION

Figure 1:
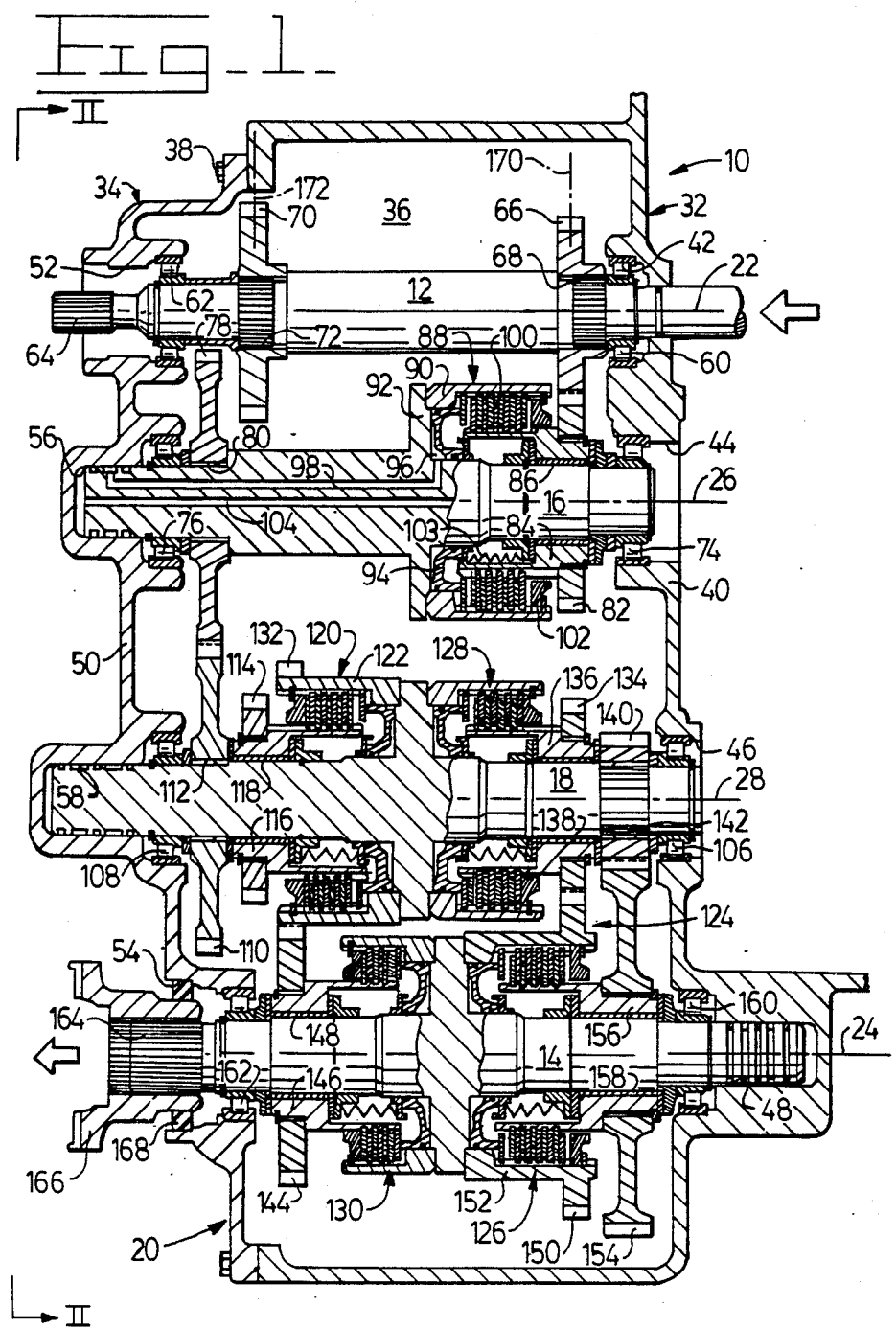
FIG. 1 is a diagrammatic, developed, but substantially side elevational sectionalized view of a three-speed forward and three-speed reverse countershaft transmission constructed in accordance with the present invention.

Referring to the developed sectional view of FIG. 1, there is shown a countershaft transmission 10 having an upper input shaft 12, a lower output shaft 14, and first and second countershafts 16 and 18 located elevationally therebetween. The four shafts 12,14,16 and 18 are rotatably mounted in a housing or case 20 respectively along axes 22,24,26 and 28 and the elevational end view of these axes may be visualized generally by reference to FIG. 2. The input and output axes 22 and 24 reside in a common longitudinally oriented vertical plane 30, while the countershaft axes 26 and 28 are at either side of this plane at about the same distance and at approximately the same elevation.

The housing 20 is generally constructed of two major pieces; namely, a front main case portion 32 disposed at the right when viewing FIG. 1, and a rear cover portion 34 located at the left. These portions are releasably connected together to define a generally enclosed chamber 36 therebetween by a plurality of threaded fasteners or bolts 38 arranged around the periphery in the usual manner. A front wall 40 of the main case portion integrally defines first, second and third stepped cylindrical bores 42,44 and 46 on the input axes 22, the first countershaft axis 26, and the second countershaft axis 28 respectively. The front wall further defines a blind, stepped cylindrical pocket 48 along the output axis 24. In a corresponding way a rear wall 50 of the cover portion 34 defines first and second stepped cylindrical bores 52 and 54 along the input and output axes 22 and 24 respectively, and first and second blind, stepped cylindrical pockets 56 and 58 respectively along the axes 26 and 28.

Figure 2:
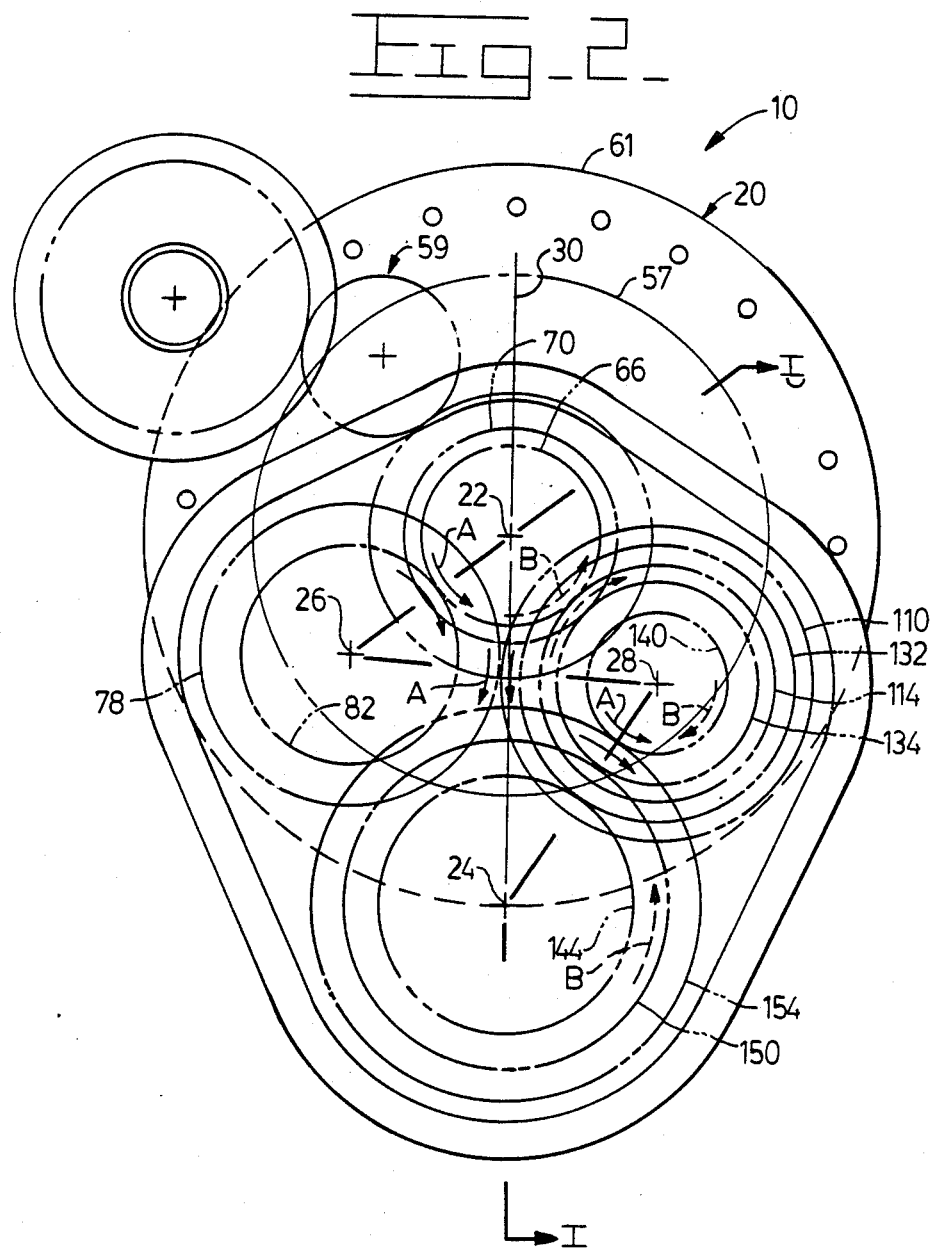
FIG. 2 is a diagrammatic, front end elevational view of the countershaft transmission of FIG. 1 taken along line II—II thereof and showing the relationship of the axes and the constantly meshing gearing on these axes, and the cutting plane of developed FIG. 1.

Preferably, the front part of the main case portion 32 can enclose a conventional hydrodynamic torque converter 57 and a pump drive gear train 59 as is partially illustrated in FIG. 2, and can be releasably connected to a forwardly disposed engine housing, not shown, in a normal manner at a circular connecting flange 61. Thus, it can be appreciated that the input shaft 12 of FIG. 1 is driven by an engine-driven torque converter with the front end of the input shaft being rotatably supported by a roller bearing assembly 60 seated in the bore 42, and the rear end being rotatably supported by a roller bearing assembly 62 seated in the bore 52. Preferably also, the rearward end of the input shaft defines an external spline 64 for serving as a power take-off (PTO) to drive auxiliary equipment. A first gear 66 is connected for joint rotation with the input shaft by a front spline joint 68, and a second gear 70 is connected for joint rotation therewith by a rear spline joint 72.

A roller bearing assembly 74 is seated in the stepped bore 44 to support the front end of the first countershaft 16, and another roller bearing assembly 76 is seated in the stepped pocket 56 to support the rear end thereof. A third gear 78 is connected for joint rotation with the first countershaft by a rear spline joint 80, and a fourth gear 82 and an externally splined hub 84 conjointly connected thereto are freely rotatably supported on the first countershaft by a front sleeve bearing assembly 86. The fourth gear 82 is in continually intermeshing engagement with the first gear 66, and a forward clutch or first directional clutch 88 is provided to selectively connect the fourth gear to the first countershaft for conjoint rotation. The forward clutch includes an internally splined drum 90 integrally connected to an annular web 92 centrally formed on the first countershaft 16. This clutch, and all of the clutches that will be subsequently described, are of the usual interleaved multiple plate and disc type. For example, the forward clutch includes an annular actuating piston 94 which is selectively movable to the right when fluid pressure is delivered to an actuation chamber 96 via a passage 98 formed in the first countershaft. Such movement of the actuating piston is sufficient to clamp a plurality of interleaved annular plates and friction discs, represented collectively by the reference number 100, against an end reaction plate 102. Since the plates and discs 100 are respectively connected to the internally splined drum 90 and externally splined hub 84, such clamping of these members together is sufficient to fully engage the clutch and to connect the fourth gear 82 to the first countershaft for joint rotation. A plurality of compression springs, one of which is shown at 103, serve to retract the actuating piston 94 and to disengage the clutch when pressure is reduced to the actuation chamber 96. Another passage 104 formed in the first countershaft serves to conduct lubricating fluid to the clutch for cooling purposes.

The second countershaft 18 is rotatably supported by a front roller bearing assembly 106 seated in the stepped bore 46 and by a rear roller bearing assembly 108 seated in the stepped pocket 58. A fifth gear 110 is connected for joint rotation with the second countershaft via a rear spline joint 112. A sixth gear 114 and associated externally splined hub 116 is freely rotatably supported on the second countershaft by a sleeve bearing assembly 118. A reverse clutch or second directional clutch 120, having basically the same construction as the forward clutch 88 previously described, and including an internally splined drum 122 integrally connected to the second countershaft, is effective when engaged to connect the sixth gear 114 to the second countershaft for joint rotation. The fifth gear 110 and the sixth gear 114 are continually intermeshingly engaged with the third gear 78 and the second gear 70 respectively.

The countershaft transmission 10 advantageously includes speed means 124 for effecting three speeds of the output shaft 14 when one of the forward and reverse clutches 88 and 120 is engaged. Such speed means includes first, second and third speed clutches 126, 128 and 130 operatively associated with the second countershaft 18 and/or the output shaft 14. Further, the speed means includes a seventh gear 132 peripherally connected to the axial extremity of the drum 122 and thus is connected to continually rotate with the second countershaft 18. An eighth gear 134 and an associated externally splined hub 136 are freely rotatably mounted on the second countershaft by a sleeve bearing assembly 138. Engagement of the second speed clutch 128 is effective to connect the eighth gear 134 to rotate with the second countershaft. Also, a ninth gear 140 is connected to the front end of the second countershaft by a spline joint 142.

Turning now to the output shaft 14, the speed means 124 also includes a tenth gear 144 which is continually intermeshed with the seventh gear 132. This tenth gear and a hub 146 are rotatably supported as a unit on the output shaft by a sleeve bearing assembly 148. The engagement of the third speed clutch 130 connects the tenth gear to the output shaft. An eleventh gear 150 is connected to the axial extremity of another internally splined drum 152 forming a part of the first speed clutch 126. The eleventh gear is continually connected to rotate with the output shaft and is continually engaged with the eighth gear 134. And, lastly, a twelfth gear 154 and an associated hub 156 are adapted to conjointly rotate on a sleeve bearing assembly 158 on the output shaft. Engagement of the first speed clutch 126 connects the twelfth gear to rotate with the output shaft. The twelfth gear 154 is intermeshingly engaged with the ninth gear 140.

The output shaft 14 is rotatably supported at its front end by a roller bearing assembly 160 seated in the stepped pocket 48, and at its rear end by a roller bearing assembly 162 seated in the stepped bore 54. The output shaft defines an external spline 164 at the rear end thereof which is adapted to releasably receive an output yoke 166, and an annular seal 168 extends between the stepped bore 54 and the yoke to retain lubricant within the chamber 36 and to exclude dirt therefrom.

The five clutches 88, 120, 126, 128 and 130 of the countershaft transmission 10 are similar in construction, and so the earlier description of the forward clutch 88 is sufficient for them all. In the instant embodiment, the size of all of the plates and discs, the actuating pistons and several other members are advantageously the same for improved parts commonality.

Industrial Applicability

In operation, the input shaft 12 is driven and this continually rotates the first and second gears 66 and 70. Assuming that the operator of the vehicle desires a first speed forward condition, the forward clutch 88 is engaged by directing fluid under pressure to the actuation chamber 96 behind the piston 94, and this clamps the plates and discs 100 together so that the fourth gear 82 rotates with the first countershaft 16. The first or low speed clutch 126 is also hydraulically engaged so that the twelfth gear 154 is adapted to rotate with the output shaft 14. Accordingly, the output shaft is driven at a relatively low speed ratio by way of gear pairs 66-82, 78-110 and 140-154. As shown by the solid line arrows identified by the letter A in FIG. 2, when the first gear 66 is driven in a counterclockwise direction, the twelfth gear 154 and the output shaft 14 are driven in a clockwise direction.

It is only necessary to disengage the first speed clutch 126 and to engage the second speed clutch 128 in order to upshift from first to second speed of the vehicle. In this mode the speed reduction ratio is reduced and the output shaft 14 is driven at a higher speed through the power path involving gear pairs 66-82, 78-110 and 134-150.

The second speed clutch 128 is disengaged and the third speed clutch 130 is engaged to further speed up the output shaft 14. Thus, the third forward speed power path is through the gear pairs 66-82, 78-110 and 132-144.

In first speed reverse, the reverse clutch 120 is engaged and the first speed clutch 126 is engaged. The second countershaft 18 is thus caused to rotate in a direction opposite to that in the forward gear conditions. As shown by the broken line directional arrows identified by the letter B in Fig. 2, the actively engaged gear pairs 70-114 and 140-154 cause the output shaft 14 to be driven in a counterclockwise direction.

The reverse clutch 120 and second speed clutch 128 are engaged in second speed reverse to cause the output shaft 14 to be driven at a reduced gear reduction ratio and at a higher speed through the gear pairs 70-114 and 134-150.

And lastly, the third speed condition provides a maximum vehicle ground speed through the gear pairs 70-114 and 132-144 when the reverse clutch 120 and the third speed clutch 130 are engaged.

The number of gear teeth and the corresponding speed reduction ratios obtained with one embodiment of the countershaft transmission 10 are shown by the charts immediately below:

| Number of Gear Teeth | |
|---|---|
| First Gear | 66:38 Teeth |
| Second Gear | 70:40 Teeth |
| Third Gear | 78:59 Teeth |
| Fourth Gear | 82:45 Teeth |
| Fifth Gear | 110:59 Teeth |
| Sixth Gear | 114:39 Teeth |
| Seventh Gear | 132:52 Teeth |

-continued

| | |
|---|---|
| Eighth Gear | 134:38 Teeth |
| Ninth Gear | 140:30 Teeth |
| Tenth Gear | 144:49 Teeth |
| Eleventh Gear | 150:63 Teeth |
| Twelfth Gear | 154:91 Teeth |

Gear Reduction Ratio

| Speed | Forward | Reverse |
|---|---|---|
| First: | −3.59 | 2.96 |
| Second: | −1.96 | 1.62 Step: 1.83 |
| Third: | −1.12 | 0.92 Step: 1.76 |
| Overall Step: | 3.21 | 3.21 |

One advantage with this construction is that the reverse speeds are about 21% faster than the output in the corresponding forward speed.

Another feature of the countershaft transmission 10 is that the rotating clutches 88,120,126,128 and 130 are located in a closely radially spaced relationship and longitudinilly between the gears. Particularly, the first gear 66 defines a first midplane 170 centrally thereof and the second gear 70 defines a second midplane 172 centrally thereof, with both planes being normal to the shaft axes 22,24,26 and 28. All five of the clutches are axially located substantially between these two planes. In a balanced manner, the third and fifth gears 78 and 110 are located axially exteriorly of the rear midplane 172, and the ninth and twelfth gears 140 and 154 are located axially exteriorly of the front midplane 170. At the same time, the back-to-back clutches 120 and 128, and 130 and 126 are closely radially spaced and laterally aligned. Also, the first directional clutch 88 is closely radially spaced from and laterally aligned with the first and second speed clutches 126 and 128. As may be visualized by reference to FIG. 2, the axes 22,24,26 and 28 and the respective rotating clutches and gears disposed thereon form a kite-shaped quadrilateral that is closely surrounded by the housing 20.

The construction of the two-piece housing 20 and its bores 42,44,46,52,54 and pockets 48,56 and 58 allows the convenient assembly of the shafts 12,14,16 and 18 and the associated members assembled thereon substantially simultaneously. And furthermore, such construction provides the plurality of passageways necessary to direct pressurized fluid to the clutch actuation chambers and to direct cooling fluid to the clutches and the bearing assemblies.

One advantage of the countershaft transmission 10 is that a speed reduction ratio change can be made to the forward pairs of gears 66-82 and 78-110 or to the reverse pair of gears 70-114 without effecting the speed reduction ratio of the speed gear pairs 132-144, 134-150 or 140-154. The reverse is also true. Thus, the countershaft transmission 10 provides flexibility between speeds and between the forward and reverse so that it can be easily modified for a variety of vehicular applications without changing the location of the axes 22,24,26 and 28 or modifying the housing 20.

Second Embodiment

Figure 3:
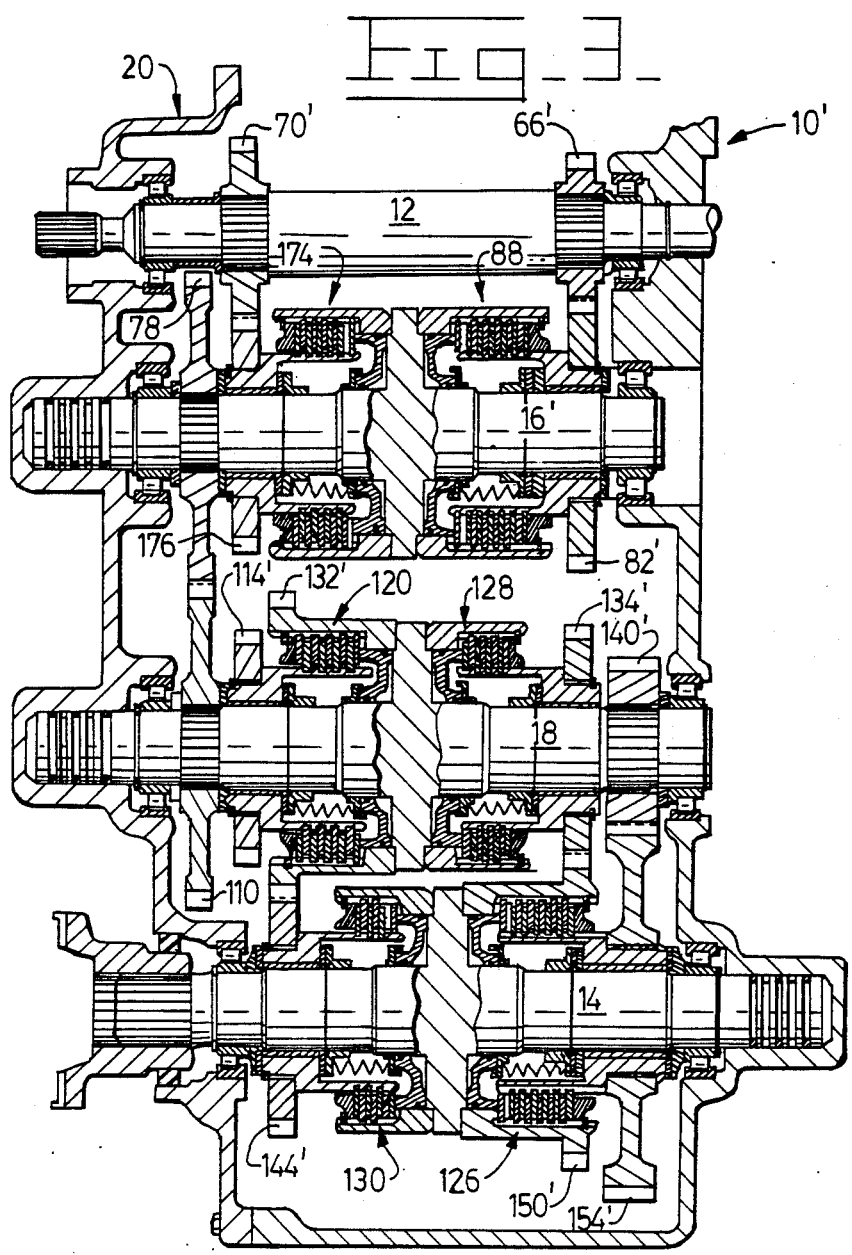
FIG. 3 is a view similar to FIG. 1 only adding one more rotating disc type clutch and another gear so that the illustrated second embodiment of the countershaft transmission is capable of providing six speeds forward.

While the first embodiment of the countershaft transmission 10 can provide three forward speeds and three reverse speeds, a second embodiment countershaft transmission 10' shown in FIG. 3 can provide six forward speeds and three reverse speeds. Many of the elements in FIG. 3 are identified by the same reference number as those described with respect to FIG. 1 because they are similar. Other elements are identified by the same reference number with a prime indicator affixed thereto in order to indicate that some modification has been made thereto over the first embodiment such as, for example, the number of teeth of the gears.

Basically, the second embodiment differs from the first embodiment by including another rotating clutch 174 and a thirteenth gear 176 on the first countershaft 16'. The thirteenth gear is continually intermeshed with and driven by the second gear 70'. The directional clutch 174 provides a smaller speed reduction ratio than the directional clutch 88 arranged in back-to-back relationship therewith, and therefore these clutches can alternately be referred to as a forward driving low speed clutch 88 and a forward driving high speed clutch 174. Accordingly, the following chart indicates the active gear trains and engaged clutches for each of the speeds provided by the countershaft transmission 10':

| Speed | Clutches Engaged | Active Gear Path | | |
|---|---|---|---|---|
| 1F | 88,126 | 66″-82″, | 78″-110, | 140″-154″ |
| 2F | 174,126 | 70″-176, | 78″-110, | 140″-154″ |
| 3F | 88,128 | 66″-82″, | 78″-110, | 134″-150″ |
| 4F | 174,128 | 70″-176, | 78″-110, | 134″-150″ |
| 5F | 88,130 | 66″-82″, | 78″-110, | 132″-144″ |
| 6F | 174,130 | 70″-176, | 78″-110, | 132″-144″ |
| 1R | 120,126 | 70″-114″, | | 140″-154″ |
| 2R | 120,128 | 70″-114″, | | 134″-150″ |
| 3R | 120,130 | 70″-114″, | | 132″-144″ |

The number of gear teeth and the corresponding speed reduction ratios obtained with this second embodiment are shown by the charts below:

Number of Gear Teeth

| | |
|---|---|
| First Gear | 66″:30 Teeth |
| Second Gear | 70″:33 Teeth |
| Third Gear | 78:59 Teeth |
| Fourth Gear | 82″:53 Teeth |
| Fifth Gear | 110:59 Teeth |
| Sixth Gear | 114″:46 Teeth |
| Seventh Gear | 132″:56 Teeth |
| Eighth Gear | 134″:43 Teeth |
| Ninth Gear | 140″:37 Teeth |
| Tenth Gear | 144″:45 Teeth |
| Eleventh Gear | 150″:58 Teeth |
| Twelfth Gear | 154″:84 Teeth |
| Thirteenth Gear | 176:44 Teeth |

Gear Reduction Ratio

| Speed | Forward | Reverse |
|---|---|---|
| First: | −4.01 | 3.17 |
| Second: | −3.03 Step 1.32 | 1.88 Step 1.69 |
| Third: | −2.38 Step 1.27 | 1.12 Step 1.68 |
| Fourth: | −1.80 Step 1.32 | |
| Fifth: | −1.42 Step 1.27 | |
| Sixth: | −1.07 Step 1.33 | |
| Overall Step | 3.75 | 2.83 |

Thus, it can be noted that the second embodiment has about a 26% faster speed in first reverse than in first forward, the steps are significantly smaller between speeds, and the overall step or reduction range in the forward gears is appreciably expanded. These features make the countershaft transmission 10' particularly advantageous for agricultural vehicles having a need for closer steps between the gears in the working range. In such instances the engine of the vehicle can be directly connected to the input shaft 12 of the transmission without the necessity of a hydrodynamic torque converter therebetween. This reduces the cost of the power train and provides a direct drive or straight mechanical power path that has greater operating efficiency.

In view of the foregoing, it is apparent that the constant mesh countershaft transmission 10 is simple and rugged in construction, is very compact, and has excellent speed reduction ratio design flexibility. A speed reduction ratio change can be made to any of the independent speed gear pairs 140-154, 134-150 and 132-144, which generally comprises a three-speed mechanism, without affecting the speed reduction ratio of the independent directional gear pairs 66-82, 78-110 and 70-114 which members comprise a directional mechanism. The reverse of this is also true. In contrast, the countershaft transmission described in International Application No. PCT/US84/01352 mentioned above has the disadvantages that the directional gear pairs are not independent of the speed gear pairs and so speed ratio design flexibility is lost, and the amount of speed ratio difference between forward and reverse is limited to less than about 10%. On the other hand, the instant transmission 10 can provide more than 20% speed ratio difference between forward and reverse. This is accomplished with very tight packaging. For example, note how third gear 78 is radially very closely spaced with respect to input shaft 12 in FIG. 1, and how the seventh gear 132 is located at the rear of drum 122 while the eleventh gear 150 is located at the front of drum 152 so that the drums of the back-to-back clutches 120/128 and 130/126 are very close together radially.

Furthermore, the countershaft transmission 10 is easily modified to provide twice the number of forward speeds by adding only one clutch and one gear to provide both low range and high range forward clutches in the directional mechanism as may be noted by comparing FIG. Nos. 1 and 3. Thus, the countershaft transmissions 10 and 10' form the basis of a family of transmissions providing compactness and speed reduction ratio flexibility for a wide variety of vehicular applications without the need to change the locations of the axes 22,24,26 and 28 or the basic construction of the housing 20. Because of the ability to provide reverse speeds over 20% faster than the corresponding forward speeds, the countershaft transmissions 10 and 10' are particularly desirable for tractor use in bulldozing/ripping applications and agricultural drawbar applications respectively. And still further, there is no need to provide an extra idler gear and support therefor that would add complexity and cost.

Other aspects, objects and advantages of this invention can be obtained from a study of the drawings, the disclosure and the appended claims.

I claim:

1. In a countershaft transmission of the type having an input shaft with first and second gears connected for joint rotation therewith, first and second countershafts, an output shaft, a third gear connected for joint rotation with the first countershaft, a fourth gear mounted for free rotation on the first countershaft and intermeshed with the first gear, a first directional clutch having an engaged position for selectively connecting the fourth gear to the first countershaft for joint rotation, a fifth gear connected for joint rotation with the second countershaft and intermeshed with the third gear, a sixth gear mounted for free rotation on the second countershaft and intermeshed with the second gear, and a second directional clutch having an engaged position for selectively connecting the sixth gear to the second countershaft for joint rotation, the improvement comprising:

the first and second gears respectively defining first and second midplanes normal to the input shaft; and speed means including a plurality of speed clutches operationally associated with the second countershaft and the output shaft for providing a plurality of speeds of the output shaft when one of the first and second directional clutches is in the engaged position, the directional clutches and the speed clutches being located axially between the midplanes in generally radially aligned relationships and the third and fifth gears being located axially exteriorly of the midplanes for maximum compactness and being independent of the speed means for speed reduction ratio flexibility.

2. The countershaft transmission of claim 1 wherein the input shaft is located at an upper elevation, the output shaft is located at a lower elevation, and the countershafts are located elevationally between the input and output shafts.

3. The countershaft transmission of claim 1 wherein the input shaft is elevationally above the output shaft and on a common vertical plane therewith.

4. The countershaft transmission of claim 1 wherein the plurality of speed clutches includes a first speed clutch located on the output shaft.

5. The countershaft transmission of claim 4 wherein the plurality of speed clutches includes a second speed clutch located on the second countershaft.

6. The countershaft transmission of claim 5 wherein the plurality of speed clutches includes a third speed clutch located on the output shaft in back-to-back relation with the first speed clutch.

7. The countershaft transmission of claim 1 wherein the speed means includes a seventh gear connected for joint rotation with the second countershaft, an eighth gear mounted for free rotation on the second countershaft, a ninth gear connected for joint rotation with the second countershaft, a tenth gear mounted for free rotation on the output shaft, an eleventh gear connected for joint rotation with the output shaft, and a twelfth gear mounted for free rotation on the output shaft, the seventh and tenth gears being intermeshed, the eighth and eleventh gears being intermeshed, and the ninth and twelfth gears being intermeshed.

8. The countershaft transmission of claim 7 wherein the plurality of speed clutches includes a first speed clutch, a second speed clutch, and a third speed clutch respectively connecting the twelfth gear to the output shaft, the eighth gear to the second countershaft, and the tenth gear to the output shaft when engaged.

9. The countershaft transmission of claim 8 wherein the ninth and twelfth gears are located axially exteriorly of the midplanes oppositely away from the third and fifth gears.

10. The countershaft transmission of claim 1 including another gear mounted for free rotation on the first countershaft and intermeshed with the second gear, and another directional clutch for selectively connecting the another gear to the first countershaft.

11. The countershaft transmission of claim 1 wherein each of the directional clutches and each of the plurality of speed clutches is of the fluid actuated disc type and includes a plurality of interleaved plates and discs.

12. The countershaft transmission of claim 11 wherein the second directional clutch and one of the plurality of speed clutches are arranged in back-to-back relation.

13. The countershaft transmission of claim 12 wherein the plurality of speed clutches includes a first speed clutch and a third speed clutch arranged in back-to-back relation.

14. A countershaft transmission comprising:
- an input shaft having first and second gears connected for joint rotation therewith and respectively defining first and second midplanes normal to the input shaft;
- a first countershaft having a third gear connected for joint rotation therewith, a fourth gear intermeshed with the first gear and being mounted for free rotation thereon, and a first directional clutch for selectively connecting the fourth gear to the first countershaft;
- a second countershaft having a fifth gear intermeshed with the third gear and being connected for joint rotation therewith, a sixth gear intermeshed with the second gear and being mounted for free rotation thereon, a second directional clutch for selectively connecting the sixth gear thereto, a seventh gear connected for joint rotation therewith, an eighth gear mounted for free rotation thereon, a second speed clutch for selectively connecting the eighth gear thereto, and a ninth gear connected for joint rotation therewith; and
- an output shaft having a tenth gear intermeshed with the seventh gear and being mounted for free rotation thereon, a third speed clutch for selectively connecting the tenth gear thereto, an eleventh gear intermeshed with the eighth gear and being connected for joint rotation therewith, a twelfth gear intermeshed with the ninth gear and being mounted for free rotation thereon, and a first speed clutch for selectively connecting the twelfth gear thereto, the third and fifth gears being disposed axially exteriorly of the midplanes and being independent of the remaining gears, the ninth and twelfth gears being located axially exteriorly of the midplanes, and all of the clutches being located axially between the midplanes.

15. The countershaft transmission of claim 14 wherein all of the clutches are hydraulically actuated and have a plurality of interleaved plates and discs.

16. The countershaft transmission of claim 15 including another gear mounted for free rotation on the first countershaft and intermeshed with the second gear, and another directional clutch for selectively connecting the another gear to the first countershaft.

* * * * *